United States Patent [19]
Lyu

[11] Patent Number: 5,754,261
[45] Date of Patent: May 19, 1998

[54] COLOR LCD DEVICE HAVING MULTIPLE BLACK MASKS

[75] Inventor: Ki Hyun Lyu, Ansan-si, Rep. of Korea

[73] Assignee: LG Electronics Inc., Seoul, Rep. of Korea

[21] Appl. No.: 616,230

[22] Filed: Apr. 11, 1996

[30] Foreign Application Priority Data

Jan. 15, 1996 [KR] Rep. of Korea ............ 0673/1996

[51] Int. Cl.$^6$ ............ C02F 1/136; C02F 1/1335; C02F 1/1333
[52] U.S. Cl. ............ 349/44; 349/106; 349/110
[58] Field of Search ............ 359/59, 67, 68; 349/42, 44, 106, 110, 111

[56] References Cited

U.S. PATENT DOCUMENTS

| | | | |
|---|---|---|---|
| 4,687,298 | 8/1987 | Aoki et al. | 349/44 |
| 4,948,231 | 8/1990 | Aoki et al. | 349/44 |

*Primary Examiner*—William L. Sikes
*Assistant Examiner*—Toan Ton
*Attorney, Agent, or Firm*—Finnegan, Henderson, Farabow, Garrett & Dunner, L.L.P.

[57] ABSTRACT

The present invention relates to a liquid crystal display device, in which a TFT array, color filters and a black matrix are provided on a single glass substrate. As a result, the second substrate of the LCD can be made thinner, thereby reducing the overall weight of the device. In addition, the LCD in accordance with the claimed invention has an improved aperture ratio. Further, less stress can be placed on the glass substrate, thereby improving yield.

17 Claims, 6 Drawing Sheets

BACK LIGHT

COLOR LCD DEVICE HAVING MULTIPLE BLACK MASKS

BACKGROUND OF THE INVENTION

1. Field of the Invention

The present invention relates to a liquid crystal display device and, more particularly, to a liquid crystal display device having an improved bonding margin between first and second glass substrates, as well as enhanced aperture efficiency.

2. Description of the Prior Art

In general, an LCD device is formed by providing a thin film transistor (hereinafter, referred to as "TFT"), pixel (picture element) electrode and color filters on a lower substrate, and a common electrode on an upper substrate. Liquid crystal material is injected between the upper and lower substrates, and a back light is provided behind the two substrates.

The conventional structure of an LCD device will now be explained with reference to the attached drawings.

As shown in FIG. 1, the conventional LCD device includes the following layers: a first glass substrate 3 having a first polarizing plate 4, a TFT and pixel electrode 2 formed on the first substrate; and a second glass substrate 7 having a color filter, a black matrix and a common electrode layer 6 formed thereon. Liquid crystal material 5 is injected between the first and the second glass substrates.

In FIG. 2, the structures of the first and the second glass substrate are illustrated in more detail. The first glass substrate 3 includes a plurality of TFTs 2a, each of which includes spaced source (S) and drain (D) electrodes above a gate electrode (G). A separate pixel electrode 2b is also formed on the first glass substrate 3 in connection with the drain electrode (D) of each TFT 2a.

As further shown in FIG. 2, a black matrix layer 6c is formed above each TFT 2a and is adjacent to red, green and blue filters 6a. The black matrix pattern is positioned to allow light to pass through the pixel electrodes and through the red (R), green (G) and blue (B) color filters 6a. A common electrode 6b is formed beneath color filters 6a and the black matrix layer 6c. Polarizing plates 4 and 8 will be described later.

However, the conventional structure of an LCD device, as described above, has the following problems.

First, in manufacturing an LCD device, the TFT and pixel electrodes are formed on the first glass substrate 3 and the black matrix layers, the color filters and the common electrode are formed on the second glass substrate 7. The two substrates are then bonded together with a space provided therebetween for receiving injected liquid crystal material 5. In this case, in order to shield the TFT from light, the black matrix is bonded or adhered to the second substrate. Accordingly, the black matrix must be aligned above each of the signal lines and pixel electrodes. Therefore, the conventional LCD cannot be fabricated without a large process margin.

Secondly, it has been proposed to extend the black matrix layer a predetermined length (d) to solve the above problem (see FIG. 2). However, this causes a reduction in numerical aperture.

SUMMARY OF THE INVENTION

It is an object of the present invention to solve the above problems by improving the bonding margin when the two glass substrates are bonded or adhered together and to reduce the overall weight of the LCD.

To obtain this object, a structure of an LCD device in accordance with the invention comprises a first glass substrate having the TFT, black matrix and color filters provided thereon, and a second glass substrate having the common electrode. In addition, liquid crystal material is provided between the two substrates.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DETAILED DESCRIPTION OF THE PREFERRED EMBODIMENT

Reference will now be made in detail to the present preferred embodiments of the invention, examples of which are illustrated in the accompanying drawings. Wherever possible, the same reference numbers will be used throughout the drawings to refer to the same or like parts.

Figure 1:
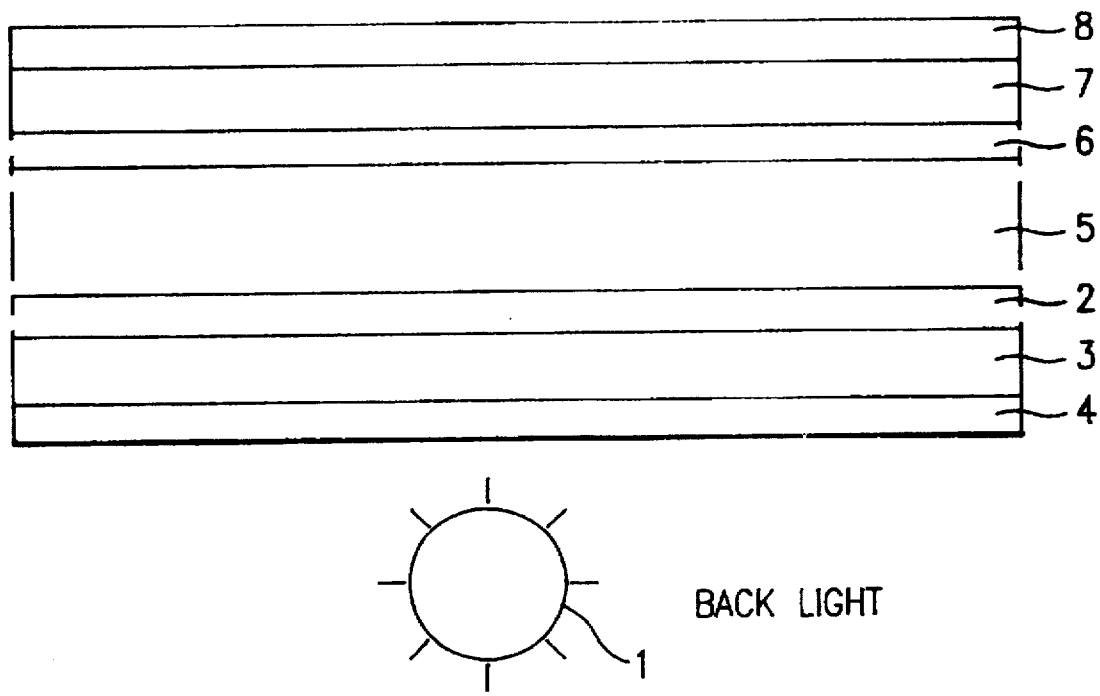
FIG. 1 is a cross-sectional view showing a conventional structure of LCD device.
Figure 2:
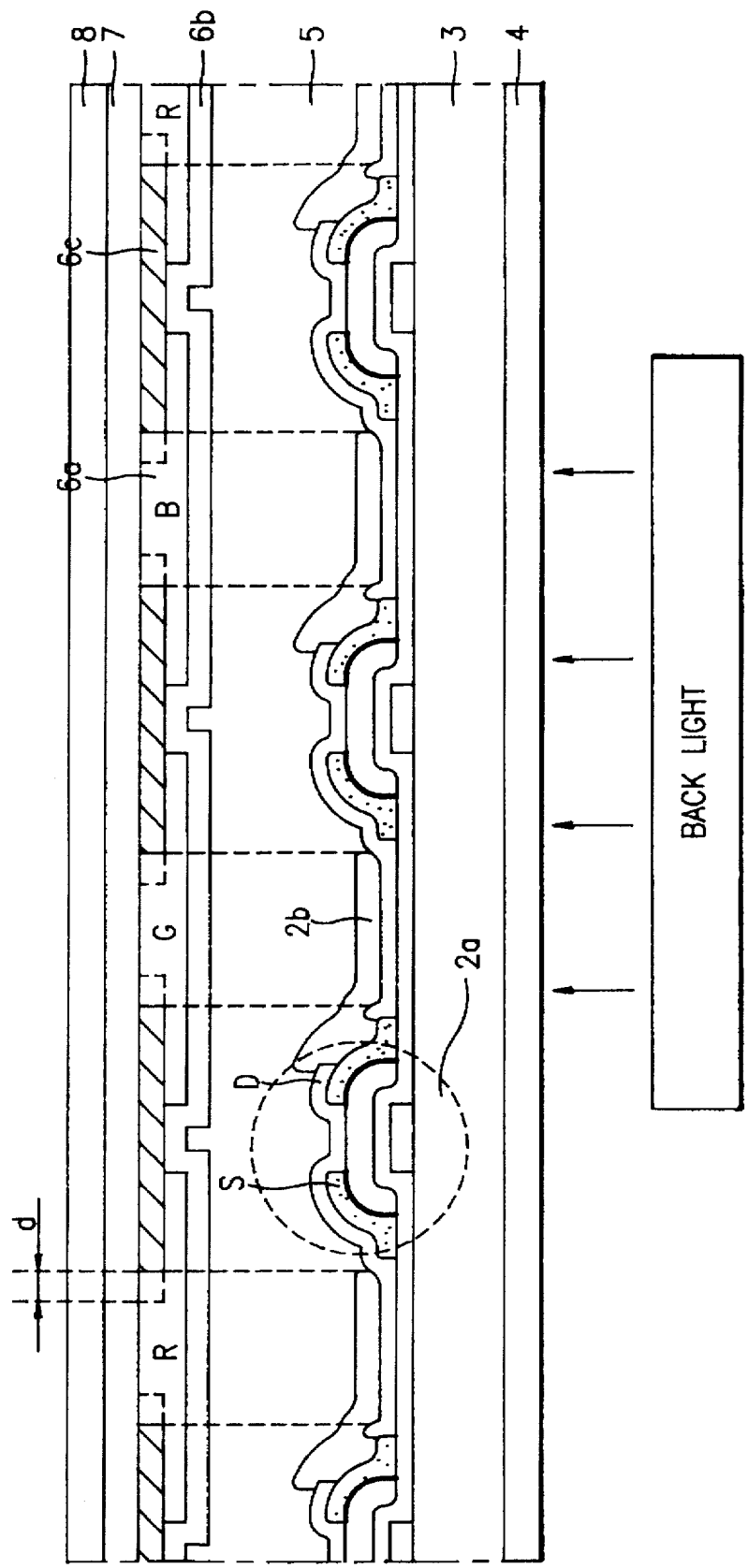
FIG. 2 is a cross-sectional view showing the conventional LCD device in greater detail.
Figure 3:
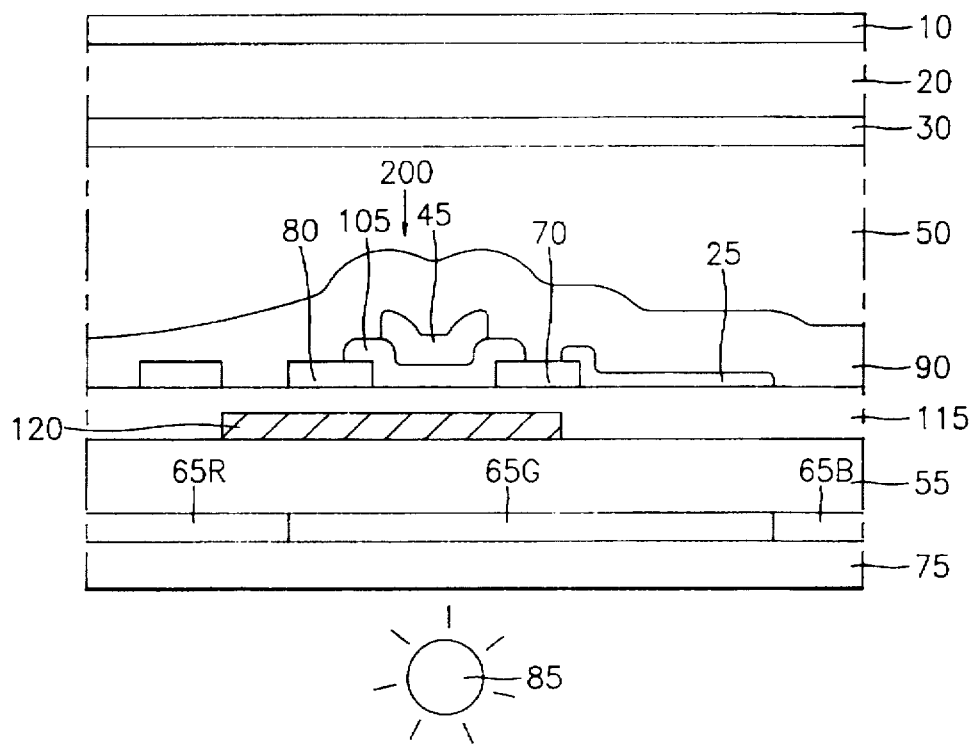
FIG. 3 is a cross-sectional view showing an LCD device in accordance with a first embodiment of this invention.

FIG. 3 illustrates a first embodiment of the present invention. The LCD in accordance with the first embodiment includes a first glass substrate 55 having a first surface, upon which a plurality of semiconductor switching elements (e.g., top-gate thin film transistors 200) are formed, and a second opposing surface facing backlight 85. As further shown in FIG. 3, a color filter layer including red, green, and blue color filters 65R, 65G, and 65B, respectively, is provided directly on the second surface of glass substrate 55. A polarizer 75 is next provided on the color filter layer.

A black matrix layer 120, including substantially opaque material, is provided on the first surface of glass substrate 55, which blocks extraneous light from backlight 85 along the periphery of the pixel electrode 25. Preferably, an amorphous semiconductor layer (a-Si:H) 115 is provided overlying black matrix 120 and portions of the first surface of glass substrate 55 not covered by black matrix 120.

Source and drain electrodes 70 and 80, respectively, are provided on semiconductor layer 115. A transparent pixel electrode 25 preferably contacts source electrode 70, and a gate insulation film 105 is provided between source 70 and drain 80 and overlying a channel region in semiconductor layer 115. A gate electrode 45 is provided on gate insulation film 105, and a passivation layer 90 is provided in overlying relationship with the entire first surface of glass substrate 55.

A second glass substrate 20 is further provided having a common indium tin oxide electrode 30 on one surface and a polarizer layer 10 on an opposing surface. The two glass substrates are brought within relatively close proximity to each other and bonded. Liquid crystal material 50 is then injected into a gap between the two substrates. Backlight 85 is provided adjacent first glass substrate 55 such that the first glass substrate is located between backlight 85 and second glass substrate 20.

Figure 4:
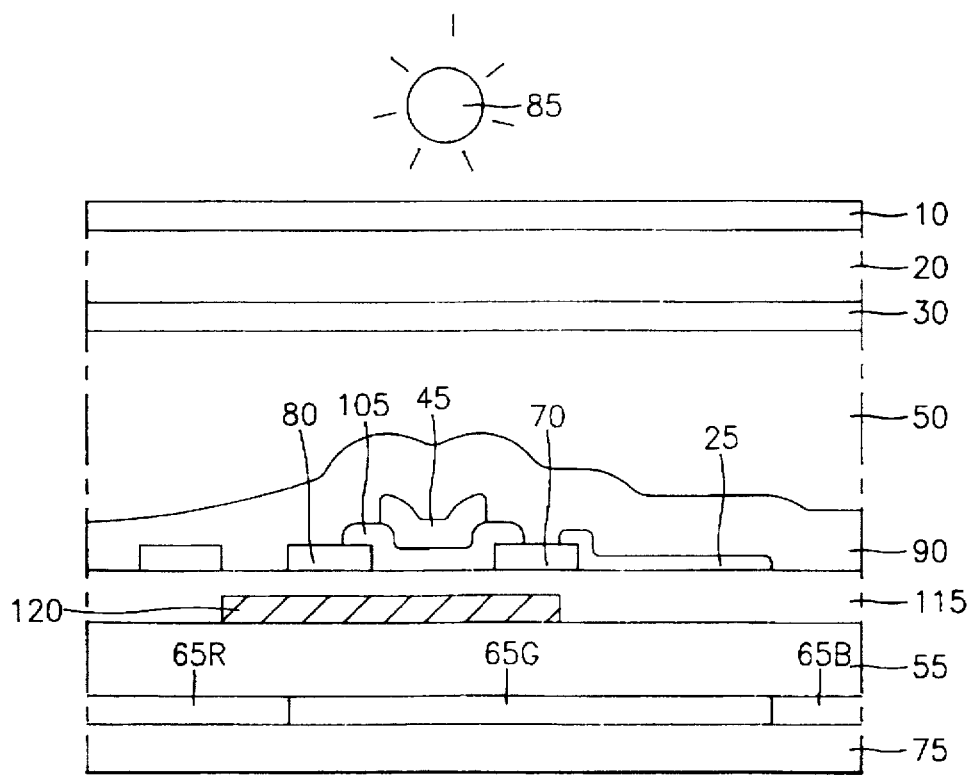
FIG. 4 is a cross-sectional view showing an LCD device in accordance with a second embodiment of this invention.

A second embodiment of the present invention will now be described with reference to FIG. 4. The second embodiment is identical to the first embodiment with the exception that backlight 85 is located adjacent the second glass substrate 20, such that the second glass substrate is provided between backlight 85 and first glass substrate 55.

Figure 5:
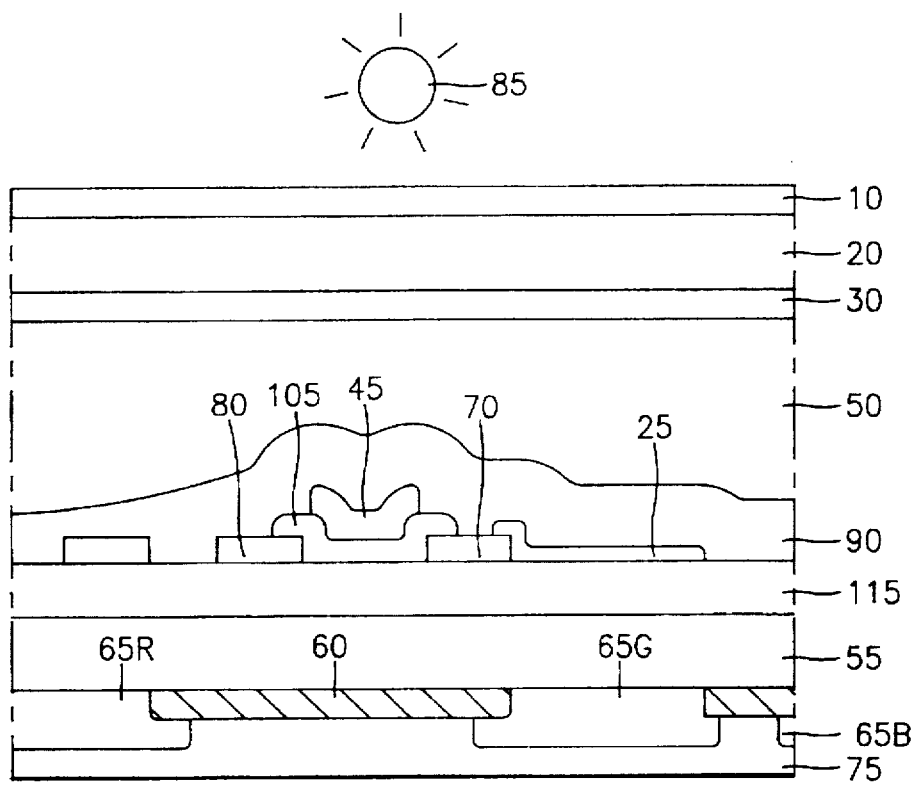
FIG. 5 is a cross-sectional view showing an LCD device in accordance with a third embodiment of this invention.

A third embodiment of the present invention will now be described with reference to FIG. 5. The third embodiment differs from the second embodiment in that the black matrix is located on the second surface of the first glass substrate 55. In particular, black matrix layer 60 is preferably aligned between adjacent pixel electrodes 25 and color filters 65, as shown in FIG. 5, for shielding extraneous light. An advantage of the third embodiment is that formation of the TFTs and pixel electrodes on one side of first glass substrate 55 and the black matrix 60 on the other side tends to reduce stress on the substrate, thereby improving yield.

Figure 6:
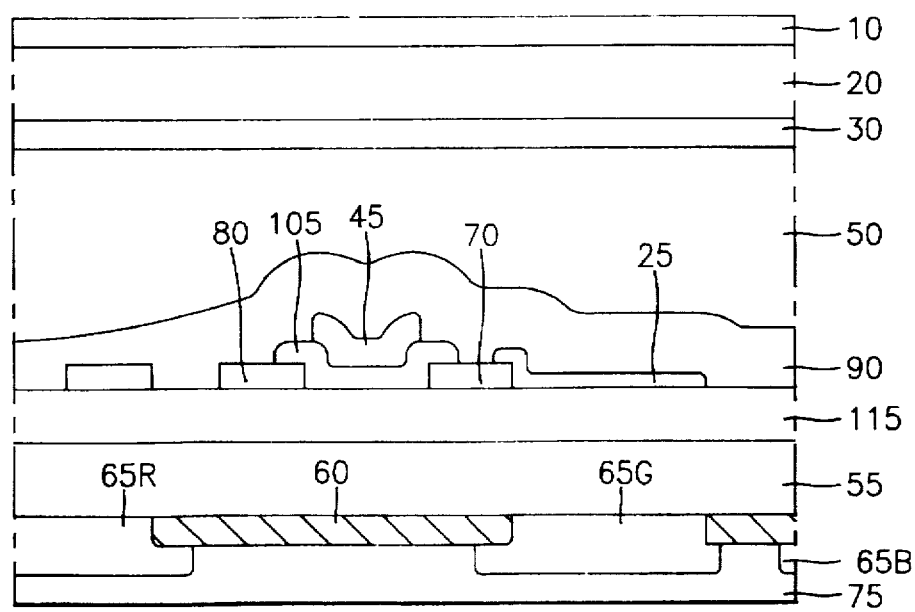
FIG. 6 is a cross-sectional view showing an LCD device in accordance with a fourth embodiment of this invention.

As further shown in FIG. 5, the backlight 85 is provided adjacent the second glass substrate 20. In contrast, in the fourth embodiment shown in FIG. 6, backlight 85 is provided adjacent the first glass substrate 55. Otherwise, the fourth embodiment is the same as the third embodiment.

Figure 7:
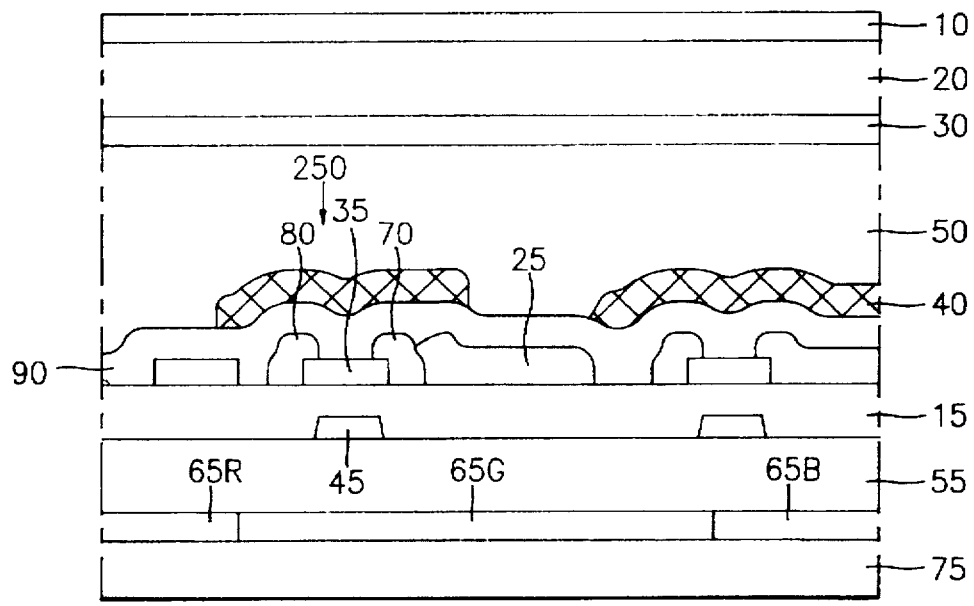
FIG. 7 is a cross-sectional view showing an LCD device in accordance with a fifth embodiment of this invention.
Figure 7:
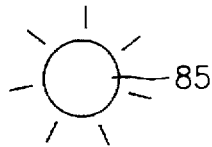

A fifth embodiment of the present invention is shown in FIG. 7. The fifth embodiment is similar to the first embodiment shown in FIG. 3. However, the fifth embodiment includes bottom gate thin film transistors 250, instead of top gate thin film transistors 200. As shown in FIG. 7, bottom gate thin film transistors 250 include a gate electrode 45 provided in contact with the first surface of first glass substrate 55. An insulating layer 15 is provided on gate electrode 45 and a remaining portion of the first surface of first glass substrate 55 not covered by gate electrode 45. An intrinsic semiconductor layer 35, preferably i-type a-Si:H, is provided on a portion of insulating layer 15 overlying gate electrode 45. Spaced source and drain electrodes 70 and 80, respectively, are also provided on insulating layer 45. As in the above-described embodiments, source electrode 70 contacts pixel electrode 25.

As further shown in FIG. 7, a black matrix layer 40 is provided above passivation layer 90 and is aligned between adjacent pixel electrodes 25. Black matrix layer 40 serves to shield extraneous light originating from the backlight 85 and insures that only light passing through the pixel electrode is transmitted through the second substrate 20 to the observer. Black matrix layer 40 also serves to shield the semiconductor layer 35 from natural light originating beyond second substrate 20.

Figure 8:
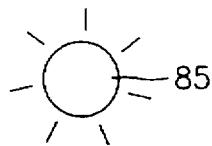
FIG. 8 is a cross-sectional view showing an LCD device in accordance with a sixth embodiment of this invention.
Figure 8:
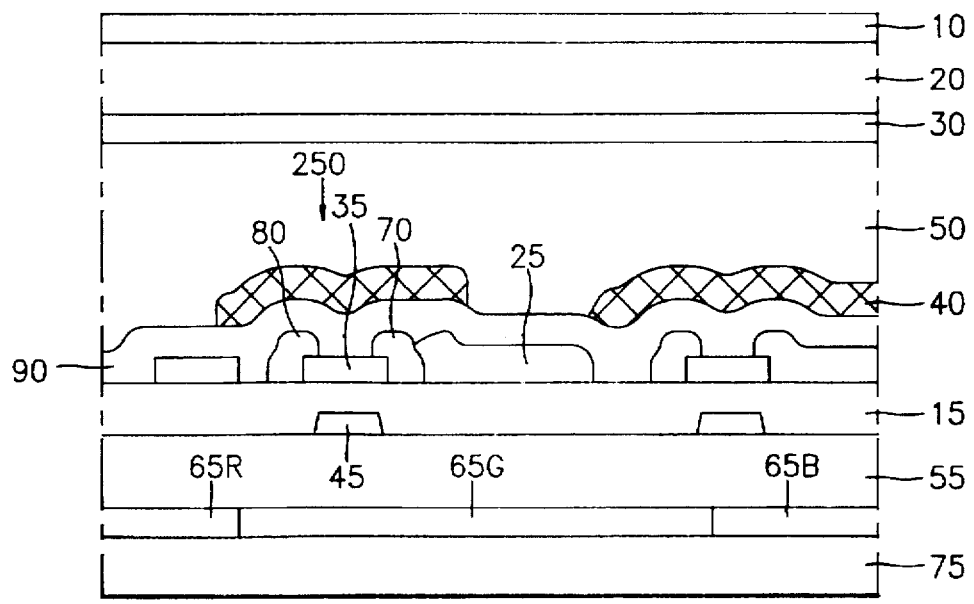

The sixth embodiment shown in FIG. 8 is similar to that shown in FIG. 7, with the exception that backlight 85 is provided adjacent the second substrate 20 instead of the first substrate 55. In this embodiment, as in the fifth embodiment, black matrix 40 serves to shield out extraneous light emitted by backlight 85. In addition, natural light is shielded from semiconductor layer 35 (i.e. the channel region of TFT 250) by the gate electrode 45.

Figure 9:
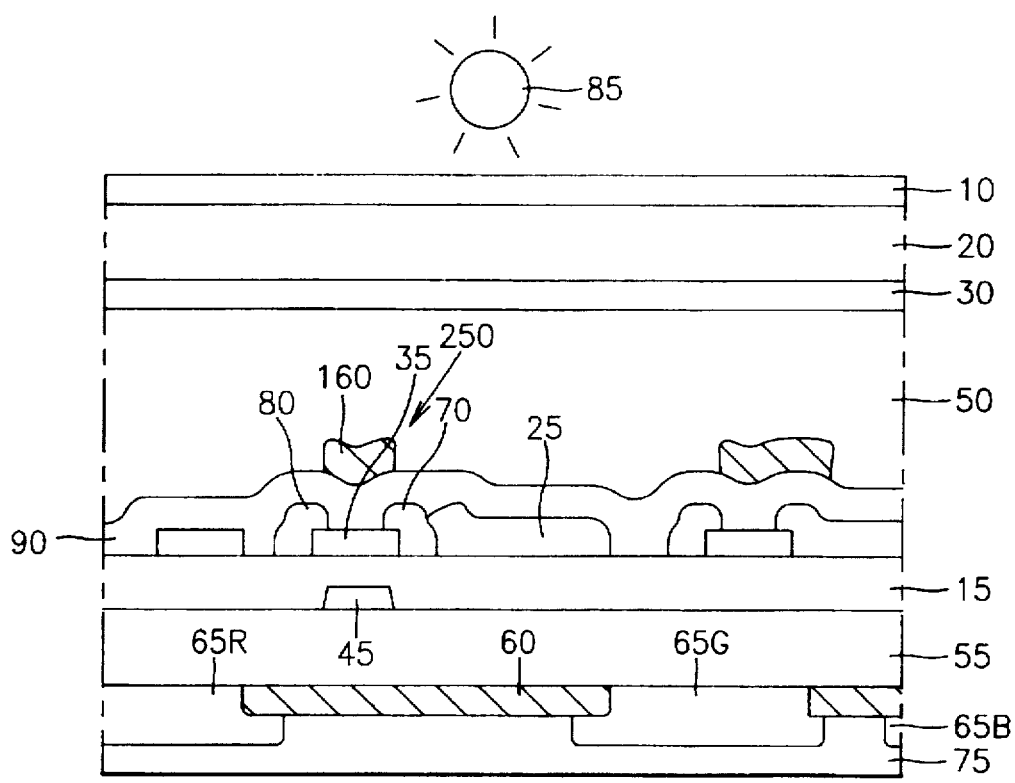
FIG. 9 is a cross-sectional view showing an LCD device in accordance with a seventh embodiment of this invention.

The seventh embodiment is illustrated in FIG. 9. The seventh embodiment, like the fifth and sixth embodiments, includes a bottom gate thin film transistor. However, the black matrix layer is provided on the second surface of the first glass substrate 55. Thus, in this respect the seventh embodiment resembles the embodiment shown in FIG. 5. Namely, black matrix 60 is preferably aligned between adjacent pixel electrodes 25 and color filters 65.

Moreover, FIG. 9 illustrates a channel black matrix layer 160 for shielding semiconductor layer 35 from the backlight 85. Preferably, the width of the channel black matrix layer 160 is less than the width of portions of black matrix layer 60 between the color filter layers 65.

Figure 10:
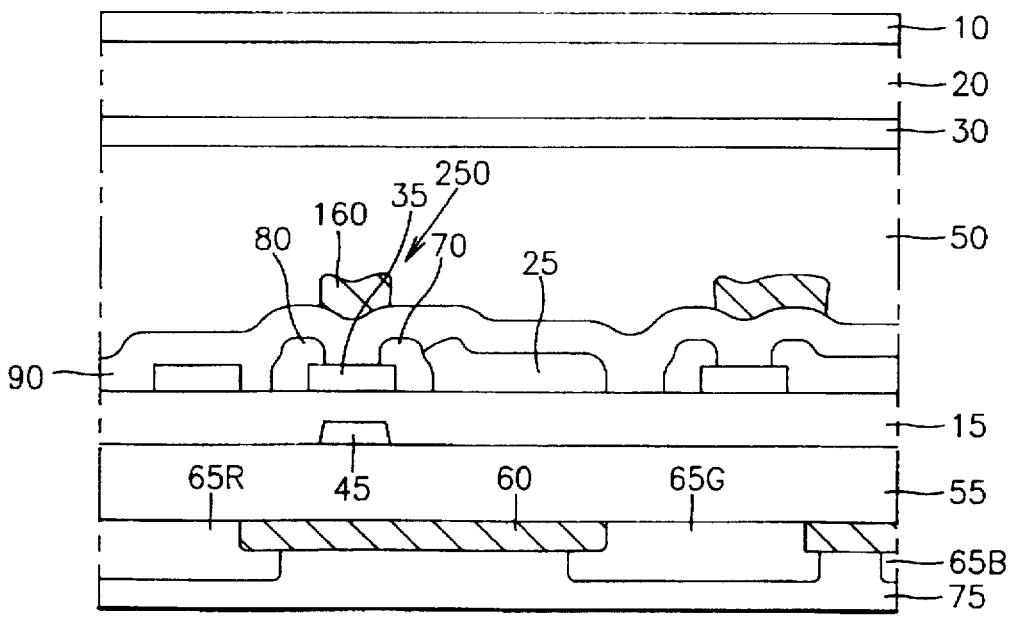
FIG. 10 is a cross-sectional view showing an LCD device in accordance with a eighth embodiment of this invention.

The eighth embodiment shown in FIG. 10 is identical to that shown in FIG. 9, except that the backlight is provided adjacent the second surface of the first glass substrate 55. In this embodiment, the channel black matrix layer 160 shields semiconductor layer 35 from natural light originating from beyond the second glass substrate 20, while black matrix 60 shield extraneous light emitted by backlight 85.

The present invention affords a number of advantages over the above-described conventional LCD. First, since the TFTs/pixel electrodes and black matrix are formed on the same substrate, less overlap between the black matrix and the pixel electrode is required, thereby reducing the process margin and improving aperture efficiency and aperture ratio. Second, since a limited number of layers are formed on the second glass substrate (e.g., only the common electrode and polarizing layers), it undergoes a reduced number of processing steps. Accordingly, the second substrate can be made relatively thin and the overall weight of the LCD in accordance with the present invention can be reduced. Third, it can provide reduced substrate stress because the TFT and the black matrix layer can be formed on opposite sides of the glass substrate.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A liquid crystal display device comprising:

a substrate having a first surface and a second surface opposite said first surface;

plurality of thin film transistors provided on respective first portions of said first surface of said substrate;

a plurality of color filters provided on respective second portions of said second surface of said substrate;

a substantially opaque layer, provided adjacent said second surface of said substrate, having portions respectively aligned with said plurality of first portions of said first surface of said substrate; and an additional plurality of substantially opaque layers provided overlying said plurality of thin film transistors provided on said first surface of said substrate, said additional plurality of substantially opaque layers respectively aligned with channel regions of said plurality of thin film transistors.

2. A liquid crystal display device in accordance with claim 1, wherein said plurality of thin film transistors comprise top gate thin film transistors.

3. A liquid crystal display device in accordance with claim 2, further comprising:

another substrate spaced from said substrate, said another substrate having a common electrode disposed thereon; and a light source, wherein said another substrate is provided between said light source and said substrate.

4. A liquid crystal display device in accordance with claim 3, wherein a liquid crystal material is provided between said substrate and said another substrate.

5. A liquid crystal display device in accordance with claim 3, wherein said another substrate has a thickness less than that of said substrate.

6. A liquid crystal display device in accordance with claim 2, further comprising:

another substrate spaced from said substrate, said another substrate having a common electrode disposed thereon; and a light source, wherein said substrate is provided between said light source and said another substrate.

7. A liquid crystal display device in accordance with claim 6, wherein a liquid crystal material is provided between said substrate and said another substrate.

8. A liquid crystal display device in accordance with claim 6, wherein said another substrate has a thickness less than that of said substrate.

9. A liquid crystal display device in accordance with claim 1, wherein said thin film transistors comprise bottom gate thin film transistors.

10. A liquid crystal display device in accordance with claim 9, further comprising:

another substrate spaced from said substrate, said another substrate having a common electrode disposed thereon; and a light source, wherein said another substrate is provided between said light source and said substrate.

11. A liquid crystal display device in accordance with claim 10, wherein a liquid crystal material is provided between said substrate and said another substrate.

12. A liquid crystal display device in accordance with claim 10, wherein said another substrate has a thickness less than that of said substrate.

13. A liquid crystal display device in accordance with claim 10, wherein widths of said additional plurality of substantially opaque layers are less than widths of said portions of said substantially opaque layer.

14. A liquid crystal display device in accordance with claim 9, further comprising:

another substrate spaced from said substrate; and a light source, wherein said substrate is provided between said light source and said another substrate.

15. A liquid crystal display device in accordance with claim 14, wherein a liquid crystal material is provided between said substrate and said another substrate.

16. A liquid crystal display device in accordance with claim 14, wherein said another substrate has a thickness less than that of said substrate.

17. A liquid crystal display device in accordance with claim 14, wherein a width of each of said additional plurality of substantially opaque layers is less than a width of said portions of said substantially opaque layer.

* * * * *